United States Patent
Shi

(10) Patent No.: US 10,425,562 B2
(45) Date of Patent: Sep. 24, 2019

(54) THREE-DIMENSIONAL IMAGE SENSING MODULE WITH A LOW Z-HEIGHT

(71) Applicant: Intel Corporation, Santa Clara, CA (US)

(72) Inventor: Wei Shi, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 501 days.

(21) Appl. No.: 14/747,887

(22) Filed: Jun. 23, 2015

(65) Prior Publication Data

US 2016/0381262 A1 Dec. 29, 2016

(51) Int. Cl.
*H04N 5/225* (2006.01)
*G02B 13/00* (2006.01)
*G02B 5/20* (2006.01)

(52) U.S. Cl.
CPC .......... *H04N 5/2254* (2013.01); *G02B 5/20* (2013.01); *G02B 13/0015* (2013.01); *H04N 5/2253* (2013.01); *G02B 5/208* (2013.01); *H04N 2213/001* (2013.01)

(58) Field of Classification Search
CPC ............. H04N 5/2254; H04N 13/0239; H04N 5/2253; G02B 13/0015; G02B 5/20; G02B 5/208
USPC .......................................................... 348/47
See application file for complete search history.

(56) References Cited

U.S. PATENT DOCUMENTS

| | | |
|---|---|---|
| 2008/0290435 A1 | 11/2008 | Oliver et al. |
| 2010/0283113 A1 | 11/2010 | Kang et al. |
| 2011/0122308 A1 * | 5/2011 | Duparre ............ H01L 27/14621 348/340 |
| 2011/0298971 A1 | 12/2011 | Fan et al. |
| 2013/0044189 A1 * | 2/2013 | Irikiin ..................... G03B 17/17 348/47 |
| 2013/0070148 A1 | 3/2013 | Kim |
| 2013/0128000 A1 | 5/2013 | Ko et al. |
| 2014/0097333 A1 * | 4/2014 | Mohammed ............ H01L 31/12 250/216 |
| 2014/0264693 A1 * | 9/2014 | Oganesian .............. H01L 24/95 257/432 |

OTHER PUBLICATIONS

Notification of Transmittal of the International Search Report and the Written Opinion of the International Searching Authority issued for International Patent Application No. PCT/US2016/033330, dated Aug. 19, 2016.

International Preliminary Report on Patentability and the Written Opinion of the International Searching Authority for International Application No. PCT/US2016/033330, dated Jan. 4, 2018, 7 pages.

* cited by examiner

*Primary Examiner* — Nguyen T Truong
(74) *Attorney, Agent, or Firm* — Womble Bond Dickinson (US) LLP

(57) ABSTRACT

Disclosed is a three-dimensional image sensing module with a low z-height, and a process for forming the same. The three-dimensional image sensing module may include two or more cameras to capture image data, where each camera includes a lens holder having at least one optical camera lens. Furthermore, the three-dimensional image sensing module may also include a spacer attached to a top side of the lens holders of the two or more cameras that provides dimensional stability for the relative positioning of the two or more cameras with respect to one another.

17 Claims, 5 Drawing Sheets

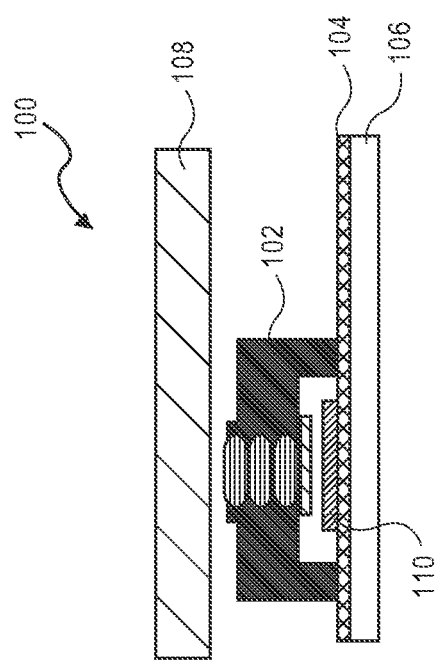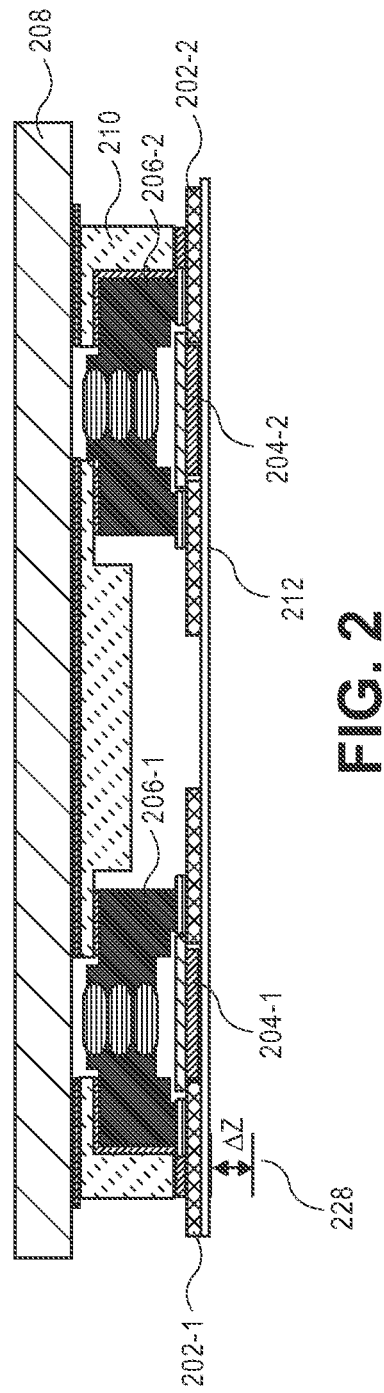

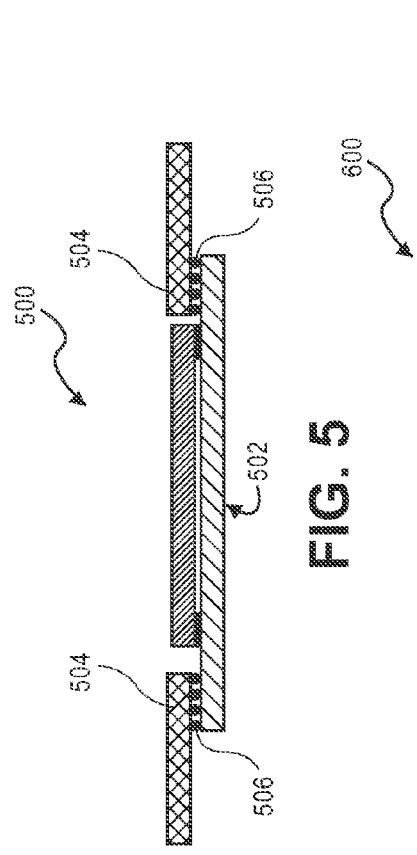
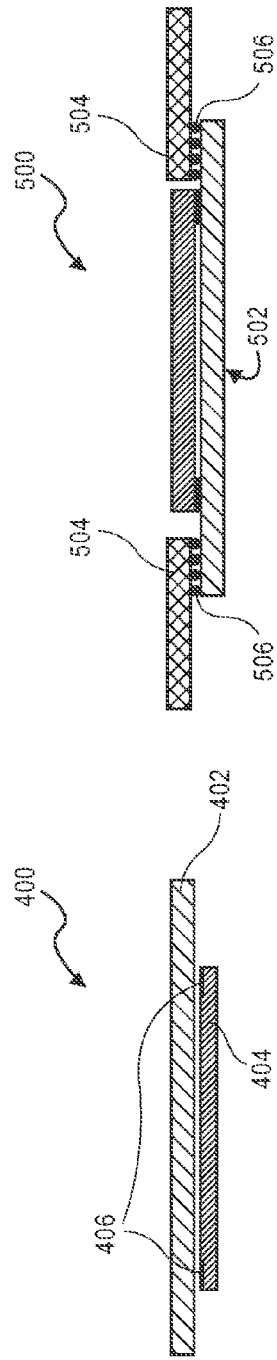
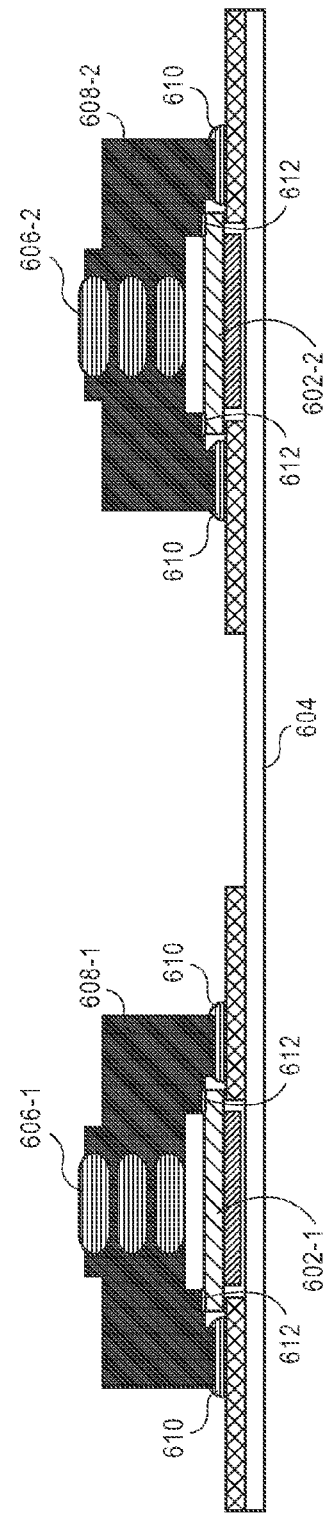

THREE-DIMENSIONAL IMAGE SENSING MODULE WITH A LOW Z-HEIGHT

TECHNICAL FIELD

Embodiments of the present invention relate generally to the field of image sensing and more specifically, to a three-dimensional image sensing module with a low z-height.

BACKGROUND

Mobile devices, such as cellular telephones, tablet computers, hand-held gaming devices, etc. are ubiquitous today. Often, such devices include the ability to capture images using a built in camera. Because reducing the size of mobile devices is important for design and aesthetic considerations, it is also important that the components of the mobile device, including the camera, fit within the mobile device. That is, as mobile device form factors are reduced, the dimensions of the cameras within those devices must also be reduced.

Furthermore, mobile devices may include more than one camera in order to provide additional imaging capabilities. One such capability is the ability to perform three-dimensional imaging using two or more cameras within the mobile device. This is made possible by knowing the relative dimensions between the two or more cameras of the mobile device, including the relative positions and angles of the cameras. For example, positioning information can be determined for real-world objects captured within the two or more cameras based on the known relative angles and positioning of the cameras within the mobile device. However, because of the reduction in mobile device form factors, the devices themselves may be flexible, thereby leading to changes in the relative angles and/or positioning of the cameras when a user inadvertently bends or warps the mobile device while performing three-dimensional imaging. As a result, the results of three-dimensional imaging processes may suffer from unwanted inaccuracies.

BRIEF DESCRIPTION OF THE DRAWINGS

Embodiments are illustrated by way of example, and not limitation, in the figures of the accompanying drawings in which:

FIG. 1 illustrates an image sensing module for three-dimensional image sensing that utilizes a metal stiffener;

FIG. 2 illustrates an embodiment of a three-dimensional image sensing module with a low z-height;

FIG. 4 illustrates an embodiment of joining an image sensor to filter glass in a process for forming a three-dimensional image sensing module with a low z-height;

FIG. 5 illustrates an embodiment of joining a flexible printed circuit onto the filter glass in the process for forming a three-dimensional image sensing module with a low z-height;

FIG. 6 illustrates an embodiment of assembling cameras on the printed circuit with a protective layer for forming a the three-dimensional image sensing module with a low z-height;

DESCRIPTION OF EMBODIMENTS

Figure 3:
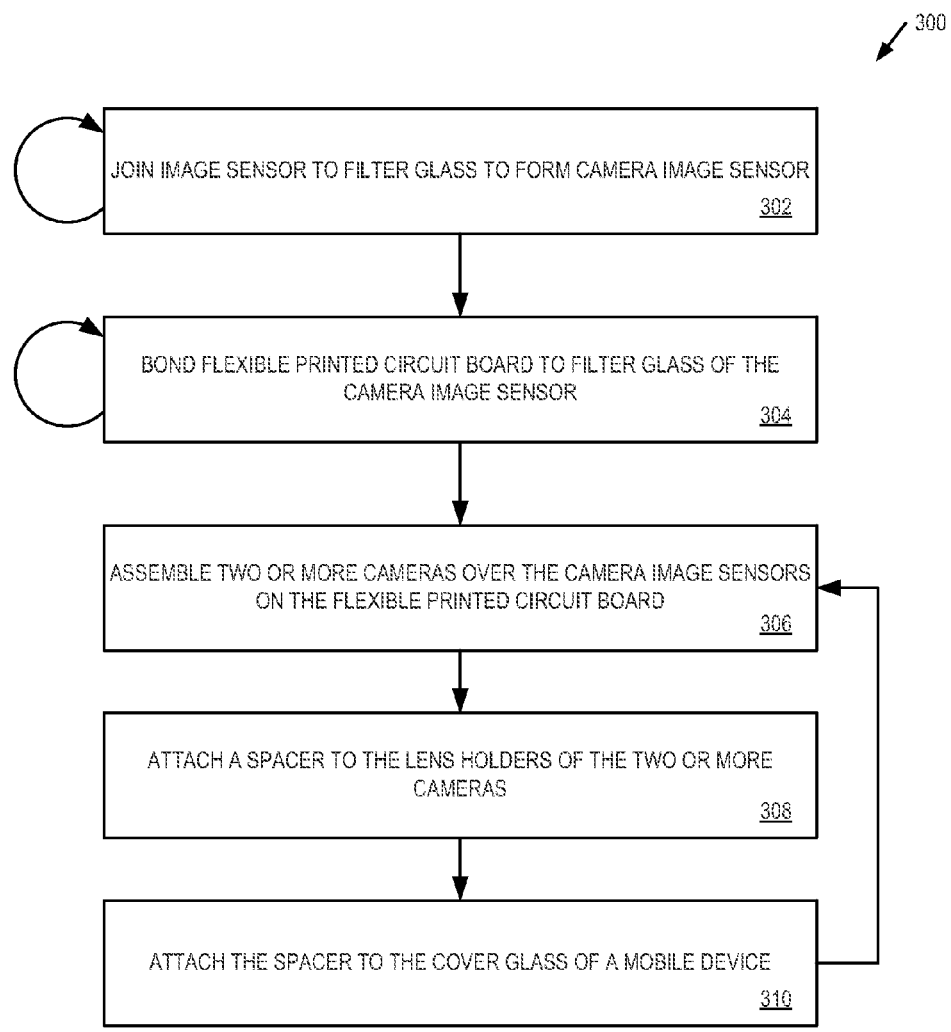
FIG. 3 illustrates a block diagram of an embodiment of a method for forming a three-dimensional image sensing module with a low z-height.
Figure 7:
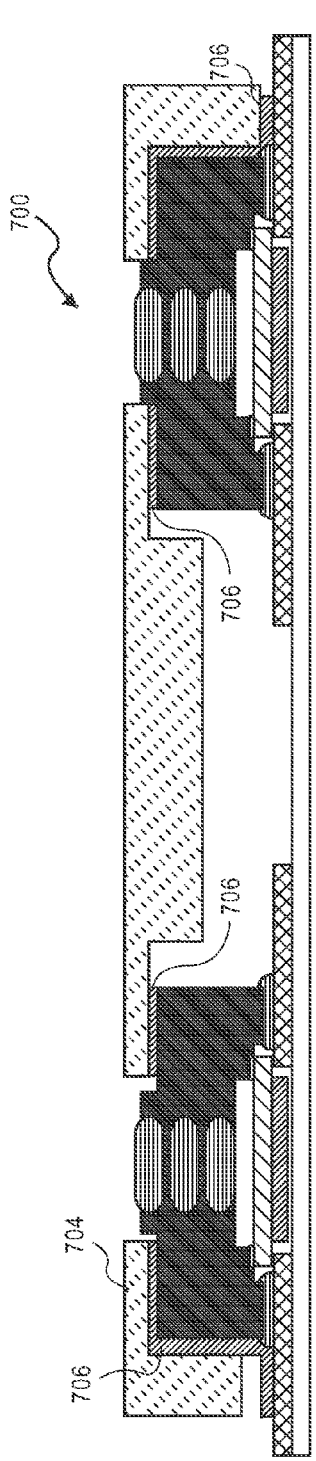
FIG. 7 illustrates an embodiment of attaching a spacer to the cameras to form the three-dimensional image sensing module with a low z-height.

A three-dimensional image sensing module with a low z-height, and a process for forming the three-dimensional image sensing module with a low z-height, are described. In one embodiment, the three-dimensional image sensing module can be included in a mobile computing device, such as a cellular telephone, tablet computer, hand-held gaming device, etc. Other computing devices, such as laptop computers, computer monitors with integrated cameras, stand-alone cameras, etc., can also include the three-dimensional image sensing module as discussed herein. For ease of discussion, and not by way of limitation, the remainder of the description will be directed to the production of a three-dimensional image sensing module for, and incorporation within, mobile devices.

In one embodiment, the three-dimensional image sensing module includes two or more cameras. These cameras are bonded to a flexible printed circuit board that provides an electrical connection between image sensors of the cameras and the processing resources of a mobile device in which the image sensing module is incorporated. The processing resources perform three-dimensional imaging applications, such as measuring real-world distances associated with objects captured in images by the cameras, using the known distances and angles between the cameras.

As will be discussed in greater detail below, each camera in the image sensing module can include an image sensor, lens holder, and one or more lenses. In one embodiment, a thin protective covering may be bonded to a backside of the flexible printed circuit board to provide thermal, conductive, and other protection for the components of the three-dimensional image sensing module. In one embodiment, the protective covering does not provide for mechanical stiffening of the cameras relative to one another. Instead, in one embodiment, a spacer, such as a glass or ceramic spacer, is attached to the lens holders of each camera in the three-dimensional image sensing module. In one embodiment, the spacer provides for mechanical stiffening of the cameras relative to one another to provide dimensional stability between the cameras in the three-dimensional image sensing module. In other words, the spacer maintains the relative positioning and relative angles between the cameras.

In one embodiment, the spacer may then be attached to the glass cover of a mobile device in which the three-dimensional imaging module is to be deployed. For example, the glass cover may be placed on top of a touch sensitive display of the mobile device. By attaching the spacer to the glass cover, the glass cover provides additional dimensional stability for the cameras in the three-dimensional image sensing module by reinforcing the dimensional stability provided for by the spacer. Thus, the combination of the spacer and mobile device glass cover ensures the dimensional stability of the cameras of the three-dimensional image sensing module.

Furthermore, an extra metal stiffener is not needed to ensure the dimensional stability of the cameras as discussed herein. FIG. 1 illustrates a conventional camera design 100 that can be used by a mobile computing device. The design includes a lens holder with one or more lenses 102 attached to a printed circuit board 104 below the mobile device's glass cover 108. An image sensor 110 is attached to the printed circuit board to transfer image data to a processor (not shown) of the mobile computing device. When two or more such cameras are utilized for three-dimensional imaging, metal stiffener 106 is attached to the printed circuit board. Metal stiffener 106 attempts to maintain the dimensional stability between the cameras of the mobile device for the three-dimensional image sensing functionality. However, such metal stiffeners often range in thickness from 0.3-0.5 millimeters adding unwanted height to the cameras. Furthermore, such metal stiffeners may not maintain the required dimensional stability based on the flexibility of the device, thickness of the stiffener, adhesives used to bond the camera to the stiffener, lack of a limitation to the lens holder of the camera, as well as for other reasons.

FIG. 2 illustrates one embodiment of a three-dimensional image sensing module 200 with a low z-height. A process for assembling the various components of the three-dimensional image sensing module, and the stages of assembly are discussed in greater detail below in FIGS. 3-8. In one embodiment, the resulting three-dimensional image sensing module 200 illustrated in FIG. 2 provides an increased dimensional stability between cameras 206-1 and 206-2, while reducing the height of the image sensing module.

In one embodiment, the three-dimensional image sensing module 200 can be included in a mobile device to enable the mobile device to perform one or more three-dimensional image processes with image data captured by the cameras 206-1 and 206-2 of the three-dimensional image sensing module. In one embodiment, the three-dimensional image sensing module includes at least two cameras, such as camera 206-1 and 206-2. However, additional cameras could be utilized for a three-dimensional image sensing module consistent with the discussion herein. Similarly, where three-dimensional imaging is not needed, but a camera's positional stability or reduction of the camera's z-height is desirable, the techniques discussed herein can be applied to a single camera.

In one embodiment, the cameras 206-1 and 206-2 are attached to one or more flexible printed circuit boards 202-1 and 202-2, which are responsible for transferring image signal data captured by image sensors 204-1 and 204-2 to a processor (not shown) of the mobile computing device. The processor can then utilize the image data, and the known and fixed relative dimensions/angles between cameras 206-1 and 206-2 to perform three-dimensional imaging (e.g., determining a real world location of an object captured in image data), as well as conventional imaging (e.g., capturing a still image or a video image for storage in a memory of the mobile device).

In one embodiment, a thin protective covering 212 is attached to the printed circuit board to protect the image sensors 204-1 and 204-2 of the cameras 206-1 and 206-2. The thin protective covering 212, as discussed herein, provides one or more of thermal, conductive, and other protection for the image sensors 204-1 and 204-2 of the cameras 206-1 and 206-2, and does not provide for mechanical stiffening.

In one embodiment, the spacer 210 may be made of glass or ceramic material, and when attached to the camera barrels of cameras 206-1 and 206-2, provides dimensional stability to assist in maintaining the relative positions and angles of the cameras. Furthermore, in one embodiment, by joining the spacer 210 to the device glass 208, the device glass provides additional dimensional stability to further assist in maintaining the relative positions and angles of the cameras.

The combination of the two sources of dimensional stability that reinforce one another, the spacer 210 joined with the device glass 208, provide a greater degree of dimensional stability than the metal stiffener 106 utilized by the convention camera design of FIG. 1. Furthermore, by eliminating the metal stiffener 106 and attaching the three-dimensional image sensing module to the mobile device's glass cover 208, a significant reduction 228 in z-height is achieved. In one embodiment, approximately 0.3-0.5 millimeters in z-height of the three-dimensional image sensing module can be saved.

FIG. 3 illustrates a block diagram of an embodiment of a method 300 for forming a three-dimensional image sensing module with a low z-height. The assembly of the three-dimensional image sensing module illustrated in FIG. 3 may be performed at multiple assembly stages and/or locations, with the intermediate assembly advanced between the stages and/or locations.

The method begins by joining an image sensor to filter glass to form a camera image sensor (block 302). In one embodiment 400, as illustrated in FIG. 4, the image sensor 404 is a complementary metal-oxide-semiconductor (CMOS) image sensor capable of detecting light and conveying image data to a processor, image processor, etc. Other image sensors, such as charge-coupled device (CCD) sensors, may also be used in accordance with the discussion herein. Furthermore, the filter glass 402 may be infrared filter glass, and joined 406 to the image sensor using a thin solder and/or epoxy to seal the image sensor to the filter glass. In one embodiment, the sealing of the sensor to the filter glass protects the image sensor from contamination by outside particles and/or debris.

A flexible printed circuit board is then bonded to the filter glass of the camera image sensor (block 304). In one embodiment 500, as illustrated in FIG. 5, the camera image sensor 502 is bonded 506 to a flexible printed circuit board 504. In one embodiment, an anisotropic conductive film bonding, or a thin solder bonding, is used to attach the filter glass 502 of the camera image sensor 502 to the flexible printed circuit board 504.

In one embodiment, blocks 302 and 304 may be repeated a plurality of times to generate a plurality of camera image sensors.

Two or more cameras are assembled over the camera image sensors, which were produced as a result of block 304, on the flexible printed circuit board (block 306). In one embodiment 600, FIG. 6 illustrates an embodiment where two cameras are attached to the flexible printed circuit board. However, more than two cameras may be attached consistent with the discussion herein. As illustrated in FIG. 6, lens holders 608-1 and 608-2 are bonded 612 to the filter glass of the camera image sensors and also bonded 610 to the flexible printed circuit board using an epoxy or thin solder bonding. In one embodiment, the bonding 612 of the lens holders 608-1 and 608-2 to the camera image sensors ensures that the camera image sensors (e.g., image sensor chip and glass filter) are solidly attached to their respective lens holders, with the attachment of the lens holders 608-1 and 608-2 to the flexible printed circuit board providing a secondary strengthening of this connection. In one embodiment, each lens holder (e.g., 608-1 and 608-2) is a plastic lens holder that includes one or more plastic optical camera lenses (e.g., 606-1 and 606-2). However, the lens holder and optical camera lenses may be constructed from any appropriate material. Each lens holder, 608-1 and 608-2, is bonded to the flexible printed circuit board over a camera image sensor 602-1 and 602-2.

Furthermore, in one embodiment, a protective layer 604 may also be attached to a backside of the flexible printed circuit board. The protective layer 604 is a thin material that protects the image sensors 602-1 and 602-2 from damage due to contact with other mobile device components, thermal protection, conductive protection, etc. The protective layer 604 may be a thin layer of a copper-tungsten alloy, nickel-cobalt ferrous alloy, or other suitable material. In one embodiment, the material is chosen based on a thinness that achieves the desired level/types of protection for image sensors. Furthermore, as discussed herein, the protective layer 604 need not provide any mechanical stiffening (e.g., dimensional stability) to ensure the relative positions of the cameras with respect to one another.

A spacer is then attached to the lens holders of the two or more cameras (block 308). In one embodiment, the spacer is a glass or ceramic spacer that is attached to the lens holders to provide dimensional stability to the cameras of the three-dimensional image sensing module. In an embodiment 700 illustrated in FIG. 7, ceramic spacer 704 is bonded 706 to a top side of the lens holders using an epoxy. In one embodiment, the spacer 704 may be a single piece of material, or be a combination of multiple pieces that make up the spacer. Furthermore, the spacer may be solid, or may have cutouts, grooves, or other features that cut the weight of the spacer while maintaining mechanical stiffness In one embodiment, the spacer's 704 height is no lower than the lenses of the cameras of the three-dimensional image sensing module. That is, the space can sit flush with the cameras' lens barrels, or can be higher than the lens barrels, to prevent the cameras lenses from touching the cover glass of the mobile device in which the camera will be included.

Figure 8:
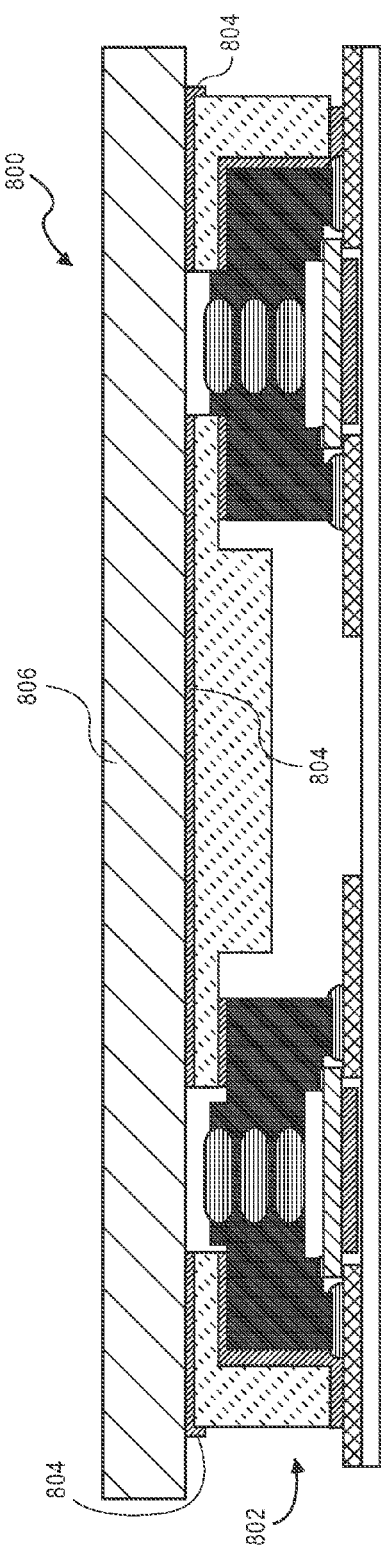
FIG. 8 illustrates an embodiment of attaching the three-dimensional image sensing module with a low z-height to a glass cover of a mobile device.

The spacer can then be attached to the cover glass of a mobile device (block 310). In one embodiment 800, as illustrated in FIG. 8, the three-dimensional image sensing module 802, including two cameras and a spacer, are bonded 804 to the cover glass 806 of a mobile computing device. The cover glass 806, in embodiments, is the device glass for a mobile telephone, tablet computer, hand-held gaming device, or other mobile computing device, such as the glass cover over a touch sensitive display. Furthermore, the cover glass can also be cover glass for a three-dimensional image sensing module for use in a laptop computer, display peripheral, stand-alone three-dimensional image sensing module, etc.

In the embodiments discussed above, the dimensional stability provided by the spacer attached to the lens holders of the cameras of a three-dimensional image sensing module, and the dimensional stability provided by the cover glass of a mobile device in which the image sensing module is deployed, serve to re-inforce one another. Thus, the overall dimensional stability of the cameras of the three-dimensional image sensing module, discussed herein, is very high, and ensures the maintenance of the relative angles and positions of the cameras of the image sensing module to a degree essential for three-dimensional image sensing applications. Furthermore, the greatly improved dimensional stability is achieved while at the same time reducing the overall z-height of the three-dimensional image sensing module. The reduction in height is very valuable for the ever decreasing size and thickness of mobile devices in which the three-dimensional image sensing module can be deployed.

Figure 9:
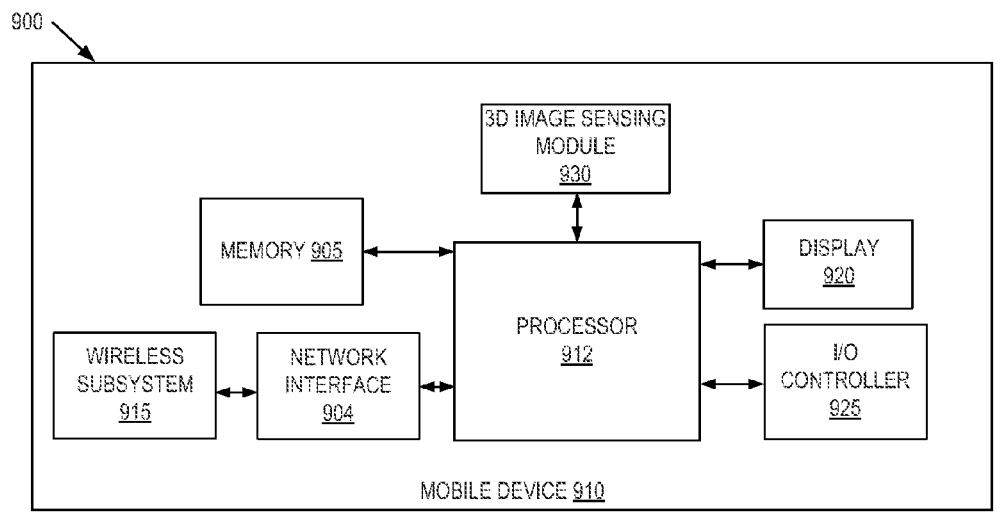
FIG. 9 illustrates one embodiment of a mobile device that includes embodiments of a three-dimensional image sensing module.

FIG. 9 is block diagram of one embodiment 900 of a mobile device 910. Mobile device 910 provides additional details for embodiments of the mobile computing devices that can use the three-dimensional image sensing module, as discussed herein.

In one embodiment, mobile device 910 is a system, which may include one or more processors 912, a memory 905, I/O controller 925, network interface 904, 3D image sensing module 930, and display 920. Mobile device 910 may also include a number of processing modules, which may be implemented as hardware, software, firmware, or a combination to perform a number of processes, including three-dimensional image scanning, distance scanning of real world object, as well as other three-dimensional image processing applications. It should be appreciated that mobile device 910 may also include, although not illustrated, a user interface (e.g., keyboard, touch-screen, or similar devices), a power device (e.g., a battery), as well as other components typically associated with electronic devices. Network interface 904 may also be coupled to a number of wireless subsystems 915 (e.g., Bluetooth, Wi-Fi, Cellular, or other networks) to transmit and receive data streams through a wireless link to/from a network, or may be a wired interface for direct connection to networks (e.g., the Internet, Ethernet, or other wireless systems). In one embodiment, both network interface 904 and wireless subsystem 915 couple mobile device 910 to a network.

Memory 905 may be coupled to processor 912 to store instructions for execution by processor 912. In some embodiments, memory 905 is non-transitory. It should be appreciated that embodiments of the invention as described herein may be implemented through the execution of instructions, for example as stored in the memory 905 or other element, by processor 912 of mobile device 910 and/or other circuitry of mobile device 910 and/or other devices. Particularly, circuitry of mobile device 910, including but not limited to processor 912, may operate under the control of a program, routine, or the execution of instructions to perform one or more 3D imaging processes using the 3D image sensing module 930. For example, such a program may be implemented in firmware or software (e.g. stored in memory 905 and/or other locations) and may be implemented by processors, such as processor 912, and/or other circuitry of mobile device 910. Further, it should be appreciated that the terms processor, microprocessor, circuitry, controller, etc., may refer to any type of logic or circuitry capable of executing logic, commands, instructions, software, firmware, functionality and the like.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The previous description of the disclosed embodiments is provided to enable any person skilled in the art to make or use the present embodiments. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The following examples pertain to further embodiments.

Example 1 is a three-dimensional image sensing module. The three-dimensional image sensing module can comprise two or more cameras to capture image data, each camera comprising a lens holder having at least one optical camera lens. The three-dimensional image sensing module can also comprise a spacer attached to a top side of the lens holders of the two or more cameras that provides dimensional stability for the relative positioning of the two or more cameras with respect to one another.

In Example 2, the subject matter of Example 1 can optionally include a glass cover of a mobile device to which the spacer is attached, wherein the glass cover reinforces the dimensional stability for the relative positioning of the two or more cameras provided by the spacer.

In Example 3, the subject matter of Examples 1-2 can optionally include the a glass cover of a mobile device to which the spacer is attached, wherein the glass cover reinforces the dimensional stability for the relative positioning of the two or more cameras provided by the spacer being one of a mobile telephone, a tablet computer, or a hand-held gaming device.

In Example 4, the subject matter of Examples 1-3, where each of the two or more cameras is assembled over an image sensor and attached to a flexible printed circuit board, can optionally the image sensors of the two or more cameras are electrically connected to a front side of the flexible printed circuit board. Furthermore, the subject matter can further optionally include a protective cover attached to a backside of the flexible printed circuit board that provides one or more of thermal and conductive protection for the image sensors without providing dimensional stability for the relative positioning of the two or more cameras with respect to one another.

In Example 5, the subject matter of Examples 1-4 can optionally include the protective cover comprising a layer of a copper-tungsten alloy.

In Example 6, the subject matter of Examples 1-4 can optionally include the protective cover comprising layer of a nickel-cobalt ferrous alloy.

In Example 7, the subject matter of Examples 1-6 can optionally include the image sensor comprising a complementary metal-oxide-semiconductor (CMOS) image sensor attached to filter glass.

In Example 8, the subject matter of Examples 1-7 can optionally include the spacer having a height that is no greater than a height of a lens barrel of the lens holder.

In Example 9, the subject matter of Examples 1-8 can optionally include the spacer being one of a glass spacer or a ceramic spacer.

All optional features of the three-dimensional image sensing module described above may also be integrated into a mobile computing device.

Furthermore, specifics in the examples above may be used anywhere in one or more embodiments. For example, a method for forming a three-dimensional image sensing module can be performed such that the resulting three-dimensional image sensing module optionally includes any of Examples 1 to 9 above.

What is claimed is:

1. A three-dimensional image sensing module, comprising:
   two or more cameras to capture image data, each camera comprising a lens holder having at least one optical camera lens;
   a spacer having portions that overlay and are attached to a top side of the lens holders of the two or more cameras that provides dimensional stability for the relative positioning of the two or more cameras with respect to one another; and
   a glass cover of a mobile device to which the spacer is attached, wherein the glass cover reinforces the dimensional stability for the relative positioning of the two or more cameras provided by the spacer, the portions of the space being between the glass cover and the lens holders of the two or more cameras.

2. The three-dimensional image sensing module of claim 1, wherein the mobile device is one of a mobile telephone, a tablet computer, or a hand-held gaming device.

3. The three-dimensional image sensing module of claim 1, wherein each of the two or more cameras is assembled over an image sensor and attached to a flexible printed circuit board, further comprising:
   the image sensors of the two or more cameras are electrically connected to a front side of the flexible printed circuit board; and
   a protective cover attached to a backside of the flexible printed circuit board that provides one or more of thermal and conductive protection for the image sensors without providing dimensional stability for the relative positioning of the two or more cameras with respect to one another.

4. The three-dimensional image sensing module of claim 3, wherein the protective cover comprises a layer of a copper-tungsten alloy.

5. The three-dimensional image sensing module of claim of claim 3, wherein the protective cover comprises a layer of a nickel-cobalt ferrous alloy.

6. The three-dimensional image sensing module of claim 1, wherein the image sensor comprises a complementary metal-oxide-semiconductor (CMOS) image sensor attached to filter glass.

7. The three-dimensional image sensing module of claim 1, wherein a height of the spacer is no greater than a height of a lens barrel of the lens holder.

8. The three-dimensional image sensing module of claim 1, wherein the spacer is one of a glass spacer or a ceramic spacer.

9. A mobile device that provides three-dimensional image sensing, comprising:
   a processor;
   a three-dimensional image sensing module coupled with the processor, the three-dimensional image sensing module includes:
      two or more cameras to capture image data, each camera comprising a lens holder having at least one optical camera lens, and
      a spacer having portions that overlay and are attached to a top side of the lens holders of the two or more cameras that provides dimensional stability for the relative positioning of the two or more cameras with respect to one another; and
   a glass cover attached to the spacer, wherein the glass cover reinforces the dimensional stability for the relative positioning of the two or more cameras provided by the spacer, the portions of the space being between the glass cover and the lens holders of the two or more cameras.

10. The mobile device of claim 9, wherein the mobile device is one of a mobile telephone, a tablet computer, or a hand-held gaming device.

11. The mobile device of claim 9, wherein each of the two or more cameras of the three-dimensional image sensing module is assembled over an image sensor and attached to a flexible printed circuit board, further comprising:
    the image sensors of the two or more cameras are electrically connected to a front side of the flexible printed circuit board; and
    a protective cover attached to a backside of the flexible printed circuit board that provides one or more of thermal and conductive protection for the image sensors without providing dimensional stability for the relative positioning of the two or more cameras with respect to one another.

12. The mobile device of claim 11, wherein the protective cover comprises a layer being one of a copper-tungsten alloy layer or a nickel-cobalt ferrous alloy layer.

13. The mobile device of claim 11, wherein the image sensor comprises a complementary metal-oxide-semiconductor (CMOS) image sensor attached to filter glass.

14. The mobile device of claim 9, wherein a height of the spacer is no greater than a height of a lens barrel of the lens holder.

15. The mobile device of claim 9, wherein the spacer is one of a glass spacer or a ceramic spacer.

16. A method for forming a three-dimensional image sensing module, comprising:
    assembling two or more cameras over associated camera image sensors on a flexible printed circuit board, each camera comprising a lens holder having at least one optical camera lens; and
    attaching overlaying portions of a spacer to a top side of the lens holders of the two or more cameras that provides dimensional stability for the relative positioning of the two or more cameras with respect to one another; and
    attaching a glass cover of a mobile device to the spacer, wherein the glass cover of the mobile device reinforces the dimensional stability for the relative positioning of the two or more cameras provided by the spacer, the portions of the space being between the glass cover and the lens holders of the two or more cameras.

17. The method of claim 16, wherein each of the two or more cameras of the three-dimensional image sensing module is assembled over an image sensor, further comprising:
    attached the two or more cameras to a flexible printed circuit board;
    electrically connecting the image sensors of the two or more cameras to a front side of the flexible printed circuit board; and
    attaching a protective cover to a backside of the flexible printed circuit board, the protective cover to provide one or more of thermal and conductive protection for the image sensors without providing dimensional stability for the relative positioning of the two or more cameras with respect to one another.

* * * * *